(12) United States Patent
Zimmer (10) Patent No.: US 11,458,674 B2
(45) Date of Patent: Oct. 4, 2022

(54) METHOD AND DEVICE FOR PRODUCING A WORKPIECE

(71) Applicant: M & R BETEILIGUNGSGESELLSCHAFT MBH, Saarbrücken (DE)

(72) Inventor: Michael Zimmer, Alsting (FR)

(73) Assignee: M & R BETEILIGUNGSGESELLSCHAFT MBH, Saarbrücken (DE)

( * ) Notice: Subject to any disclaimer, the term of this patent is extended or adjusted under 35 U.S.C. 154(b) by 519 days.

(21) Appl. No.: 15/768,240

(22) PCT Filed: Oct. 13, 2016

(86) PCT No.: PCT/DE2016/100476
§ 371 (c)(1),
(2) Date: Aug. 14, 2018

(87) PCT Pub. No.: WO2017/063640
PCT Pub. Date: Apr. 20, 2017

(65) Prior Publication Data
US 2019/0054685 A1  Feb. 21, 2019

(30) Foreign Application Priority Data
Oct. 13, 2015  (DE) .................... 10 2015 117 418.9

(51) Int. Cl.
*B29C 64/147*  (2017.01)
*B33Y 10/00*  (2015.01)
(Continued)

(52) U.S. Cl.
CPC ............ *B29C 64/147* (2017.08); *B28B 1/001* (2013.01); *B32B 37/025* (2013.01);
(Continued)

(58) Field of Classification Search
CPC ... B29C 64/147; B29C 64/182; B29C 64/141; B32B 38/1808; B32B 39/00;
(Continued)

(56) References Cited

U.S. PATENT DOCUMENTS

| 5,352,310 A | 10/1994 | Natter |
| 6,068,692 A * | 5/2000 | Zimmer .................. B41M 1/34 106/426 |

(Continued)

FOREIGN PATENT DOCUMENTS

| EP | 2886307 A1 | 6/2015 |
| JP | H10207194 A | 8/1998 |

(Continued)

OTHER PUBLICATIONS

English Translation of JP 2003159754 (Year: 2003).*

*Primary Examiner* — Timothy Kennedy
*Assistant Examiner* — Olukorede Esan
(74) *Attorney, Agent, or Firm* — Lucas & Mercanti, LLP; Klaus P. Stoffel (57) ABSTRACT

A device and production method, in which a workpiece is built up gradually in layers. To build up the workpiece, preformed layers, which are individually formed on a layer support using an electrophotographic printing process are transferred one at a time from the layer support to the workpiece. For this purpose, the layer is transferred to the workpiece in a printing operation, the layer being preferably laid on the workpiece by a die. In one embodiment, a plurality of workpieces are built up simultaneously and a plurality of preformed layers are transferred simultaneously to different respective workpieces. In another embodiment, the layer is formed on the layer support, which is preferably a film or paper, prior to being transferred.

24 Claims, 4 Drawing Sheets

(51) Int. Cl.
  *B32B 38/18* (2006.01)
  *B32B 39/00* (2006.01)
  *B32B 37/00* (2006.01)
  *B32B 38/00* (2006.01)
  *G03G 15/22* (2006.01)
  *B33Y 30/00* (2015.01)
  *B28B 1/00* (2006.01)
  *G03G 15/14* (2006.01)

(52) U.S. Cl.
  CPC ........ *B32B 38/145* (2013.01); *B32B 38/1808* (2013.01); *B32B 39/00* (2013.01); *B33Y 10/00* (2014.12); *B33Y 30/00* (2014.12); *G03G 15/14* (2013.01); *G03G 15/224* (2013.01)

(58) Field of Classification Search
  CPC .. B32B 37/025; B32B 38/145; G03G 15/224; G03G 15/14; B33Y 30/00; B33Y 10/00; B28B 1/001
  See application file for complete search history.

(56) References Cited

U.S. PATENT DOCUMENTS

| | | |
|---|---|---|
| 6,206,672 B1 | 3/2001 | Grenda |
| 2013/0075013 A1 | 3/2013 | Chillscyzn et al. |
| 2013/0077997 A1 | 3/2013 | Hanson et al. |
| 2013/0186558 A1* | 7/2013 | Comb ................ G03G 15/2021 156/277 |
| 2014/0182775 A1* | 7/2014 | Taniuchi ................ B32B 37/02 156/246 |
| 2015/0024169 A1* | 1/2015 | Martin ............... G03G 15/1625 428/172 |
| 2015/0273767 A1 | 10/2015 | Batchelder et al. |
| 2016/0311210 A1 | 10/2016 | Günther et al. |

FOREIGN PATENT DOCUMENTS

| | | | | |
|---|---|---|---|---|
| JP | 2003159754 | * | 6/2003 | ............. B29C 67/00 |
| WO | 2008096105 A1 | | 8/2008 | |
| WO | 2015082923 A1 | | 6/2015 | |

* cited by examiner

METHOD AND DEVICE FOR PRODUCING A WORKPIECE

CROSS-REFERENCE TO RELATED APPLICATION

The present application is a 371 of International application PCT/DE2016/100476, filed Oct. 13, 2016, which claims priority of DE 10 2015 117 418.9, filed Oct. 13, 2015, the priority of these applications is hereby claimed and these applications are incorporated herein by reference.

BACKGROUND OF THE INVENTION

The invention pertains to a production method in which a workpiece is built up gradually in layers. The invention also pertains to a device for the successive build-up of a workpiece in layers.

Various methods of the type indicated above are known through their use and are used for rapid prototyping. One of these methods is multijet modeling (MJM), in which, by means of a print head comprising several nozzles, workpieces are built up layer by layer. In the case of laminated object manufacturing (LOM), layers of ceramic, plastic, or metal sheets or of paper are laminated together. In stereolithography, workpieces are built up gradually by the use of a laser to cure layers of a liquid photopolymer. All the methods suffer from the disadvantage that they are slow and are therefore not adapted to the production of large quantities.

SUMMARY OF THE INVENTION

The invention is based on the goal of creating a method of the type indicated above by means of which this disadvantage can be overcome.

According to the invention, this goal is achieved in that, to build up the workpiece, preformed layers, which are formed on a layer support by means of an electrophotographic printing process, are transferred one at a time from the layer support to the workpiece.

To form the workpiece, several layers are bonded successively to each other, and the layer support is separated from the layers bonded to the workpiece. Because the layers can be transferred at high frequencies and because not only a single workpiece but rather a plurality of workpieces can be built up simultaneously, the method according to the invention is adapted to mass production.

In one embodiment of the invention, the layer is transferred to the workpiece in a pressing step by means of a transfer unit of the previously mentioned device. The layer is advisably laid on the workpiece, which is built up on a preferably movable workpiece carrier, wherein preferably the layer support is moved to the workpiece and/or the workpiece is moved to the layer support. The layer is bonded to the workpiece under slight pressure, which is preferably exerted on the layer by a die.

Alternatively or supplementally, the layer and the workpiece can be electrically charged and/or magnetized in such a way that the layer is moved onto the workpiece by an electrical or magnetic attracting or repelling force. Whereas it is conceivable that the layer could be arranged on an intermediate support before it is transferred to the workpiece, such as on a cylinder in the case of offset printing, and then transferred from there directly to the workpiece, the transfer unit in a preferred embodiment of the invention comprises a die, which is provided to contact the layer support and which serves as back-up support for the layer as the layer is being transferred.

For the transfer operation, the die is advisably moved toward the workpiece and/or the workpiece toward the die, preferably by the movement of the workpiece carrier, and the die and workpiece are then moved away from each other again after the layer has been laid in position, wherein the layer is separated from the support element. So that the previously mentioned force of electrical and/or magnetic attraction or repulsion force can be produced, the device could be equipped with a unit for applying an electrical field to the layer and/or the die on the one side and to the workpiece on the other in order to assist the transfer by means of forces of electrostatic attraction or repulsion. The die could be provided so that it is electrically chargeable and/or magnetized or magnetizable. It would also be conceivable that the die itself could form an electromagnet or that an electromagnet could be arranged on the die or near the die, by means of which a magnetic field is created to transfer the layer when the layer is to be transferred to the workpiece.

The previously mentioned transfer unit is advisably provided to arrange the layer support in a transfer position, which allows the individual layer in question to be transferred to a location provided on the workpiece.

In one embodiment of the invention, the transfer unit comprises a positioning unit, which comprises a sensor, by means of which the position of the layer support and/or of the layer to be transferred can be detected; the positioning unit is set up to arrange the layer support or the layer in the associated transfer position on the basis of the data obtained by the sensor. Whereas it would be conceivable that the sensor could be provided in such a way that it cooperates with electrically conductive or magnetic materials applied to the layer support, in the preferred embodiment of the invention, it is formed by a camera, which detects at least the area in which the layers are transferred to the workpiece. The individual position of the layer in question or of the layer support is advisably compared by means of a computer with the location provided on the workpiece to which the layer is to be applied, and the layer support is moved, if necessary, into the transfer position.

Alternatively or supplementally, the layer support can be provided with at least one marking which is detectable by the sensor, on the basis of which the layer support can be arranged in the individual transfer position in question.

In one embodiment of the invention, several of the layers which are intended to be arranged on top of each other during the build-up of the workpiece are arranged on the layer support one behind the other in the direction of a movement of the layer support relative to the workpiece. To transfer the layer in question, the layer support is moved step by step into the transfer position for the layer.

In an especially preferred embodiment of the invention, several workpieces are built up simultaneously, wherein several preformed layers are transferred simultaneously to different workpieces. The advantage of this is that a plurality of workpieces can be built up in a single operation. The workpieces to be formed can be of the same type or of different types. They preferably have the same form, structure, color, and material or the same materials, but they can also have different forms, structures, colors, and/or materials.

Layers which are intended to be arranged in the same location on the various workpieces are advisably transferred simultaneously. It is obvious that the various workpieces can be arranged simultaneously on a single carrier body and/or can be bonded to each other by means of a single die.

In another embodiment of the invention, the layer is formed on the layer support by means of a printing operation before it is transferred. Especially suitable for this purpose are xerographic printing methods. Each of the layers is, or, if several layers are to be applied to the layer support one behind the other or one next to the other, the plurality of layers are preferably generated on the basis of a digitized print image, which specifies the structure of the individual layer or layers to be produced.

Because the printing process and a layer-forming unit provided for this purpose, in particular a printing device, preferably an electrophotographic printer, make it possible to form the layers on the layer support at high frequencies, the time it takes for the production of the entire workpiece is significantly decreased in comparison to the other methods mentioned above.

The printing process advisably comprises the steps of producing an electrical latent image or charge image on a photosensitive recording material, which usually contains a photoconductive material; subsequently developing the latent image or charge image with a layer-forming material; transferring the image thus obtained to the layer support; and fixing the layer-forming material by use of, e.g., heat, pressure, or solvent vapor to form the layer. To make electrically latent images or charge images visible, various development methods are known, such as the magnetic brush method, the cascade development method, the fur brushing method, the powder cloud method, the contact development method, the "skip" development method, and the magnet dry method.

A laser printer has been found to be highly advantageous as the means to carry out the electrophotographic printing process. The layer can be printed with a resolution of up to 5000 dpi. It has been found favorable to set the laser power, the discharge corona, the contrast potential, and the coating of the layer-forming means to the highest possible values. The optimal process conditions can be determined by simple experiments as a function of the printing device used in the case in question. Nevertheless, it would also be conceivable that the layer could be applied by means of an inkjet printer.

The layer is advisably formed with a thickness of ≥0.001 mm, and preferably of ≥0.01 mm, and then transferred to the workpiece. Advantageously, it is then also possible to achieve a relatively high resolution in the direction in which the workpiece is built up. It is especially preferable, however, for the layer to be printed in a thickness in the range of 0.01-0.1 mm. To build up the workpiece as quickly as possible, the layer could also be applied relatively thickly to the layer support, e.g., to a maximum thickness of 0.1-3 mm, and preferably to a maximum of 1-2 mm.

Whereas it would be conceivable that the formation of the layers on the layer support and the build-up of the workpiece from the layers could be separated from each other in both time and space, so that the layer support provided with the layers could be, for example, transported or put in interim storage, the production of the layers and their transfer to the workpieces in the preferred embodiment of the invention are carried out in a single work step. For this purpose, the device is advisably set up to move the layer support to the transfer unit immediately after it has been provided with the layer.

The layer support is advisably provided in such a way that the layers adhere to it, especially also during the movement of the layer support, but also in such a way that the layers can be completely separated from it during the process of building up the workpiece. The use of a flexible layer support has been found to be especially advantageous for handling purposes.

The layer support is preferably in the form of a web and possibly provided in such a way that that it can be arranged on a roll. If several layers are arranged on the layer support, it is provided in one embodiment of the invention that the layer support can be rolled up together with the layers arranged on it, so that it can be more easily stored and/or transported. To transfer the layers to the workpiece, the layer support with the layers is then unrolled again and moved to the transfer unit.

The method step of printing the layer support, which is much faster than the transfer of the layer from the layer support for the purpose of building up the workpiece, and the method step of transferring the layers can be carried out separately from each other. As a result, the production of the layers and the production of the workpiece can be managed more effectively.

In addition, the possibility is created of providing the electrophotographic printing device at a location different from that of the transfer unit. Under certain conditions, a single printing device can supply several transfer units, possibly provided at different locations, with the layer supports provided with the layers. After the layer support has been completely rolled up onto the roll and the roll has been set up for use in a unit for transferring the layer from the layer support to the workpiece, the layer support and the layers arranged on it form an intermediate product in the method according to the invention.

The layer support, furthermore, could be provided as a plurality of individual sheets, which can preferably be stacked in the printed state. For transfer of the layer or layers in question to the workpiece, the individual sheets could preferably be transported by means of a unit for removing single sheets from a stack of individual sheets and placing them on the transfer unit.

In another embodiment of the invention, the layer support is configured as an endless belt, i.e., as a closed ring, and new layers are applied to it one by one and removed from it again during the transfer process. It is obvious that the endless belt will move continuously past the layer-forming unit, so that it can be provided with the layer, and is then moved past the workpiece downstream in the movement direction of the endless belt, so that the layer can be transferred to workpiece.

The layer support is preferably formed by a film or paper, in particular silicone paper, waxed paper, or paper coated with polytetrafluoroethylene (Teflon-coated paper). Because film and paper are flexible and, if they are configured as webs, can be rolled up, they are especially well-adapted to use in the method.

In one embodiment of the invention, the layer is formed out of plastic, ceramic, glass, metal oxide, and/or metal and possibly a carrier material for it and/or possibly wax as support material, wherein the layer can comprise various materials or material combinations. As previously mentioned, the layer could be configured to be electrically chargeable and/or magnetized or magnetizable.

The plastic, the ceramic, the glass, the metal oxide, and/or the metal are advisably in the form of particulates. In one embodiment of the invention, the particulates are processed into a layer-forming agent, which comprises the particulates and the carrier material, preferably a binder resin. The layer-forming agent advisably comprises fine particles, each of which comprises the carrier material and the particulates, which are dispersed in the carrier. The particles preferably comprise a diameter of 1-100 μm, wherein an average particle size of 5-30 μm is especially preferred. The amount of particulates in the layer-forming material is advisably in the range of 10-70 wt. %.

The layer-forming agent is preferably produced by mixing the particulates and the carrier material intimately together, by kneading the mixture thus obtained in the molten state; by cooling, grinding, and preferably pulverizing; and by classifying to the desired particle size.

The carrier material is preferably provided in such a way that it burns during a later heat treatment without leaving any residue behind, and its elasticity is adjusted in such a way that it can absorb the desired quantity of particulates and preferably does not break when the mixture is ground (pulverized).

The binder resin is preferably built up from vinyl monomers. Specific examples of vinyl monomers include: styrene and its derivatives such as, for example, styrene, ortho-methylstyrene, metha-methylstyrene, para-methylstyrene, para-methoxystyrene, and para-ethylstyrene; methacrylic acid esters such as methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, and diethylaminoethyl methacrylate; acrylic acid esters such as, for example, methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, and phenyl acrylate; derivatives of acrylic acid and methacrylic acid such as acrylonitrile, methacrylonitrile, and acrylamide. Other examples include: dicarboxylic acids with a double bond and their derivatives such as, for example, maleic acid, monobutyl maleate, dibutyl maleate, monomethyl maleate, and dimethyl maleate; vinyl esters such as vinyl chloride, vinyl acetate, and vinyl benzoate; vinyl ketones such as, for example, vinyl methyl ketone and vinyl ethyl ketone; and vinyl ethers such as vinyl methyl ether, vinyl ethyl ether, and vinyl isobutyl ether. These monomers can be either polymerized individually or copolymerized in a mixture of two or more. It is especially preferable to use styrene or its derivatives alone or in combination with other monomers or ester derivatives as listed above. In addition, polyurethanes, polyamides, epoxy resins, terpene resins, phenolic resins, aliphatic or alicyclic hydrocarbon resins, aromatic petroleum resins, chlorinated paraffins, and paraffin waxes are also suitable. Several of the above-cited binder resins can also be used in combination.

In one embodiment of the invention, the layer-forming agent comprises a preferably electrostatically charged or chargeable charge control agent so that the layer for the electrophotographic printing process can be provided with an electrostatic charge; and/or the layer-forming agent can comprise an agent for improving the fluidity. The charge control agents can be formed by soot, iron black, graphite, nigrosin, metal complexes of monoazo dyes, Hansa yellow, benzidine yellow, zinc atoms, and/or various lacquer pigments. The fluidity can be improved by means of, for example, hydrophobic colloidal silicon dioxide. The last-mentioned agents are preferably present in the layer-forming agent in an amount in the range of 0.05-5 wt %, and even more preferably of 0.1-2 wt.

In addition, the layer-forming agent could contain magnetic particles such as iron, manganese, nickel, cobalt, chromium, magnetite, hematite, various ferrites, manganese alloys, and other ferromagnetic alloys. It is also conceivable, furthermore, that the layer-forming agent could contain carrier particles such as Iron powder or glass beads.

In one embodiment of the invention, at least one of the layers is formed out of several sublayers, preferably comprising different materials, these sublayers being arranged successively on the support element to form the layer. The sublayers advisably are formed on top of and/or next to each other, so that 2-dimensional or 3-dimensional structures can be built up even within the layer to be arranged on the support element.

The previously mentioned printer unit advisably comprises for this purpose at least two printing drums, each of which can arrange one of the materials on the layer support or, during the buildup of the layer, on one of the sublayers already applied.

In one embodiment of the invention, at least one of the sublayers or one of the layers is formed by a support material, which is provided so that it can be removed completely from the workpiece, preferably melted out of it. The support material, which is formed preferably of natural or synthetic wax in particular, can be kneaded to ensure that the workpiece is sufficiently stable when certain workpiece geometries such as voids, curvatures, or undercuts are to be produced, and it is removed from the workpiece after the workpiece has been built up.

In another embodiment of the invention, the device comprises a unit for generating ultrasound and/or a heating unit, which comprises preferably a laser and/or an infrared lamp. The heating unit makes it easier to separate the layer from the layer support; in addition, the layer and/or the workpiece can be heated to improve the bond between them.

In one embodiment of the invention, an agent for dissolving the carrier material is applied, preferably sprayed, onto the layer after it has been transferred to the workpiece. The solvent is advisably applied in such a way that it partially dissolves the carrier material of the layer and, in the area of the workpiece where the layer has been applied, partially dissolves the carrier material of the workpiece, so that the layer and the workpiece are bonded together by the cross-linking of the carrier materials of the layer and workpiece. This has the advantage that, when the solvent is applied, it is not necessary to heat the layer so that it will bond to the workpiece and/or to exert pressure on it. Water or toluene can be considered for use as the solvent.

The layers are advisably provided with an adhesive layer, by means of which they can be bonded together, wherein the adhesive layer can be formed by the last sublayer to be applied to the layer.

In one embodiment of the invention, at least one of the sublayers or one of the layers is formed by a support material, which is provided so that it can be removed completely from the workpiece, preferably melted out of it. This support material, which is formed preferably of wax, preferably natural or synthetic wax, can be needed to ensure that the workpiece is sufficiently stable when certain workpiece geometries such as voids, curvatures, or undercuts are to be produced, and it is removed from the workpiece after the workpiece has been built up.

In another embodiment of the invention, each layer is heated after it has been applied to the workpiece; a layer can be heated individually, or several layers can be heated jointly, the purpose being to bond the layer to the workpiece and possibly to bond the layers to each other. This has the advantage that the layer or the layers can then be cured or sintered immediately, layer by layer, and the support material possibly removed from the workpiece. A heating unit provided for this purpose advisably comprises a laser, preferably a laser diode, and is set up to heat the layer or layers in question uniformly or, if necessary, to heat them intentionally to different temperatures. During the heating step, the carrier material and/or the support material can be removed. The heating is conducted as a function of the material in question in the layer or layers; for ceramic, glass, metal oxide, and/or metal, a temperature in the range of 600-1500° C. is used; for plastic, a temperature in the range of 150-600° C. is appropriate.

Depending on the material or materials out of which the workpiece is built up, it can be advisable, especially when the layers have not previously been heated to bond them together, to heat-treat, especially to sinter, the workpiece after all of the layers have been put in place for the purpose of bonding the layers together and in particular to bond the individual particulates together to form an integral body constituting the workpiece. During such a heat treatment, the carrier material and/or the support material can also be removed. The heat treatment is carried out as a function of the specific material being used; for ceramic, glass, metal oxide, and/or metal, a temperature in the range of 600-1500° C. is used, for plastic a temperature in the range of 150-600° C. is appropriate.

It is understood that the formation of the layer on the layer support and the transfer of the layer to the workpiece are carried out under computer control, wherein preferably a data set is used which comprises the shapes and dimensions of the workpiece to be built up. A data set of this type is typically a CAD file or the like.

For the purpose of open-loop and/or closed-loop control, the device comprises, in one embodiment of the invention, an open-loop and/or closed-loop control unit, by means of which it is possible to control, in an open-loop and/or closed-loop manner, the formation of the layer on the layer support, especially the formation of the sublayers; the corresponding selection of materials, and/or the transfer of the layer to the workpiece. In particular it is possible to control the operation of the transfer unit, including the movements of the layer support, of the die, and/or of the workpiece support, and to control the heating unit and/or the ultrasound generator.

In one embodiment of the invention, the open-loop and/or closed-loop control unit is provided for the purpose of determining, from the previously mentioned data set, the form of the layer or sublayers and/or to determine the material to be used, to set up the device accordingly to execute the method, and possibly to carry out the method.

BRIEF DESCRIPTION OF THE DRAWING

The invention is explained in greater detail below on the basis of exemplary embodiments and the attached drawings, which refer to the exemplary embodiments. In schematic fashion.

DETAILED DESCRIPTION OF THE INVENTION

Figure 1:
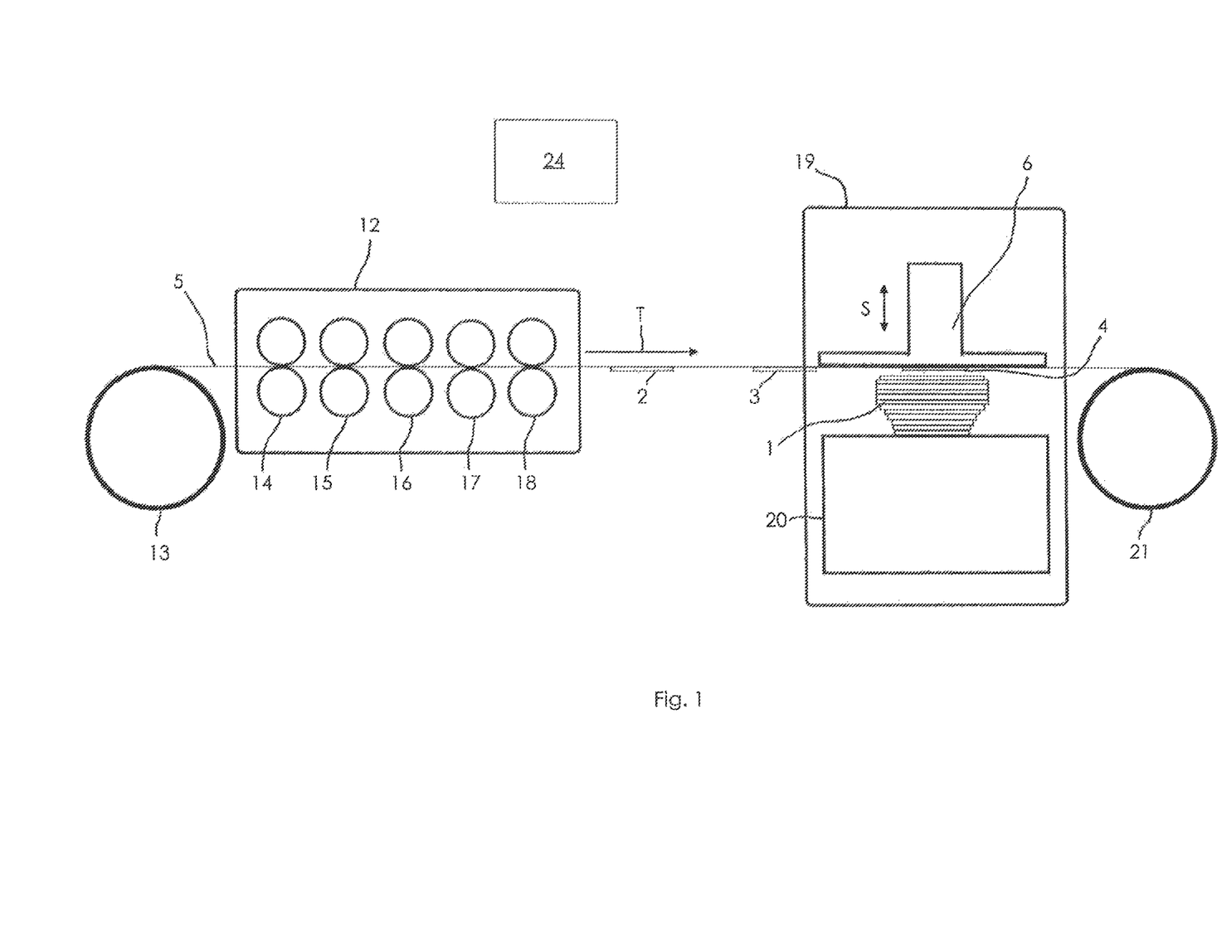
FIG. 1 shows a device according to the invention.

A device according to the invention shown in FIG. 1 comprises a xerographic printing unit 12, which is set up to print layers 2, 3, 4 on a layer support 5, which is formed by a paper web. It also comprises a transfer device 19, by means of which the layers 2, 3, 4 can be transferred from the layer support 5 to a workpiece 1, and an open-loop and/or closed-loop control unit 24 for the closed-loop and/or open-loop control of the printing unit 12 and the transfer unit 19.

The printing unit 12 comprises a holder for a roll 13, onto which the layer support 5 is rolled up, and five printing drums 14, 15, 16, 17, 18, which are provided with a photosensitive coating and which are set up for the printing of different materials.

The transfer unit 19 comprises a carrier body 20, on which the workpiece 1 is arranged and built up, and a die 6, by means of which a first layer of the workpiece 1 is arranged on the carrier body 20 to start, whereupon additional layers 2, 3, 4 are laid onto the workpiece 1, which is thus in the process of being built up. The die 6 is movable in the directions indicated by the double arrow S to place the layer 2, 3, 4 onto the carrier body 20 or the workpiece 1 for transfer and then, under separation of the layer support 5 from the layer 2, 3, 4 of the workpiece 1, to release again.

The transfer unit 19 also comprises an ultrasound-generating unit (not shown), which can direct the ultrasonic vibrations onto the die to assist the separation of the layer 2, 3, 4 from the layer support 5 during the transfer of the individual layer 2, 3, 4 in question.

In addition, the transfer unit 19 is provided with a laser (not shown), by means of which, shortly before the transfer, the layer 2, 3, 4 and/or the workpiece 1 can be heated in the area onto which the layer 2, 3, 4 is to be applied in order to bond the layer 2, 3, 4 to the workpiece 1.

So that the layer support 5 can be arranged accurately enough with respect to the workpiece 1 in the individual transfer positions, i.e., the positions in which the layers 2, 3, 4 can be transferred to the workpiece, the transfer unit 19 also comprises a camera (not shown), which detects the area in which the workpiece 1 is covered by the layers 2, 3, 4 and which is connected to the closed-loop and/or open-loop control unit 24 for data transmission.

Behind the transfer unit 19, seen in the feed direction T of the layer support 5, another holder for a roll 21 is provided, onto which the layer support 5 can be rolled after the layers 2, 3, 4 have been transferred to the workpiece 1.

The holders for the rolls 13 and 21 are each provided with a motor for transporting the layer support 5. The motors can be controlled in an open-loop and/or closed-loop manner by the open-loop and/or closed-loop control unit 24 in order to adjust the position of the layer support 5 with respect to the workpiece 1 or the carrier body 20. The layer support 5 can for this purpose be movable in the feed direction T and possibly in a direction perpendicular to that.

The open-loop and/or closed-loop control unit 24 comprises a computer, which is set up to generate CAD file data, which describe the form of the workpiece 1 to the produced, on the basis of which data the shapes of the layers 2, 3, 4 and the materials to be used to form them can be determined. From the data, the computer generates print images, on the basis of which the xerographic printing unit 12 can be controlled, and determines the transfer positions for the arrangement of the layers 2, 3, 4 when they are to be transferred to the workpiece 1.

The following method is used to build up the workpiece 1:

First, a CAD file containing the data on the form of the workpiece 1 and from which the print images for the printing device 12 are generated, is loaded into the computer 1.

On the basis of the data, the open-loop and/or closed-loop control unit 24 sets up the printing unit 12 and directs stepping motors to start moving the layer support 5. The layer support 5 is now guided from the roll 13 through the printing unit 12, and thus sublayers 7, 8, 9, 10, 11, from which the layers 2, 3, 4 are built up, are formed by means of the printing drums 14, 15, 16, 17, 18 (see FIGS. 2 and 3).

Figure 2:
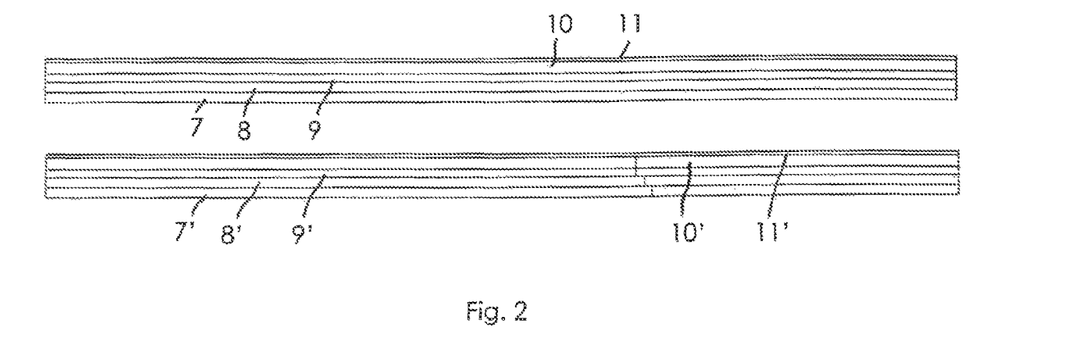
FIG. 2 shows a side view of details of layers which can be produced by means of the device according to FIG. 1.
Figure 3:
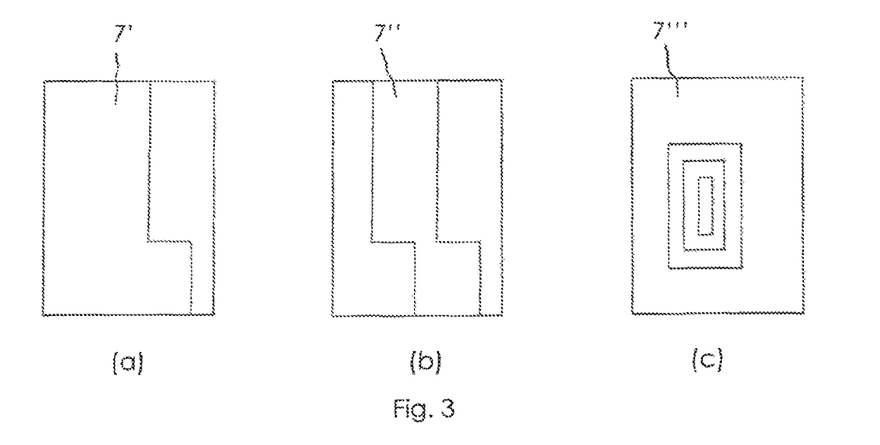
FIG. 3 shows a top view of details of layers which can be produced by the device according to FIG. 1.

For example, the printing drum 14 can be provided to print a sublayer 7 of thermoplastic material, the printing drum 15 to print a sublayer 8 of metal, the printing drum 16 to print a sublayer 9 of ceramic, the printing drum 17 to print a sublayer 10 of a thermoset, and the printing drum 18 to print an adhesive layer 11, wherein it should be noted that the sublayers 7, 8, 9, 10, 11 can contain a carrier material to make the various materials, which may be in the form of powders, capable of flowing.

FIG. 2*a* shows a side view of a layer built up in this manner. As shown in the side view of FIG. 2*b* and a top view of FIG. 3, sublayers 7', 8', 9', 10' could also be subdivided in a plane and comprise different materials in the plane. FIGS. 3*a*, 3*b*, and 3*c* are intended merely to show by way of example on the basis of sublayers 7', 7'', 7''' that different patterns can be formed in the sublayer planes in question in order to produce a 3-dimensional structure in the workpiece 1. Individual sublayers could also be formed out of a support material, which serves merely to stabilize the workpiece 1 as it is being built up and which is later removed.

After the printing step, the layers 2, 3, 4 are moved by the layer support 5 into the transfer unit 19. As soon as one of the layers 2 is to be transferred to the workpiece 1, the camera detects the position of the layer 2 and transmits this to the open-loop and/or closed-loop control unit 24, which moves the layer support 5 by means of the motors into the individual transfer position in question. As soon as the layer 2 has arrived in the transfer position, the adhesive layer (sublayer 11) is heated by the laser, and the die 6 is moved down toward the workpiece 1 to press the layer 2 against the workpiece 1 and to bond it to the workpiece 1.

After the workpiece 1 has been built up completely, it is taken from the transfer unit 19 and sintered to obtain the finished product, wherein the carrier material and the support materials are removed from the workpiece 1, and the various layers 2, 3, 4 and sublayers 7, 8, 9, 10 bond additionally to each other.

In the following, reference is made to FIGS. 4-6, in which the same parts or parts which have the same effect are designated by the same reference numbers as those used in FIGS. 1 and 2, a letter being appended to the reference number in question.

Figure 4:
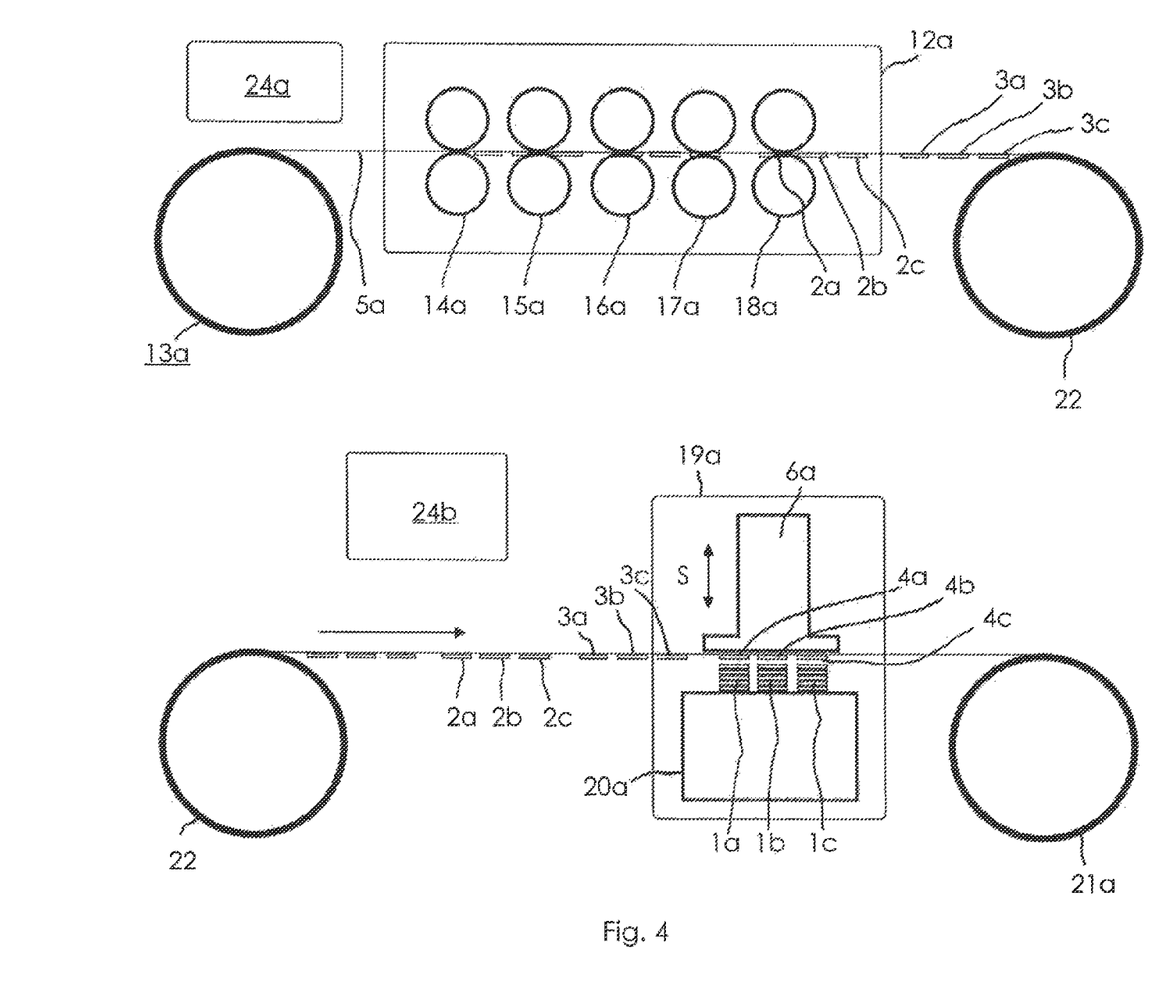
FIG. 4 shows another device according to the invention.

Another device according to the invention shown in FIG. 4 differs from that of FIG. 1 in that a printing unit 12*a* and a transfer unit 19*a* are spatially separated from each other.

After a layer support 5*a* has been printed with layers 2*a*, 2*b*, 2*c*, 3*a*, 3*b*, 3*c*, 4*a*, 4*b*, 4*c*, it is rolled up onto a roll 22. The roll 22 now provided with the printed layer support 5*a* can now be put into interim storage and transported later; so that workpiece 1*a*, 1*b*, 1*c*, can be built up, it is placed on a holder of the transfer unit 19*a*, from which the layer support 5*a*, as described above, can be guided to the carrier body 20*a* and the die 6*a* to build up the workpiece.

Figure 5:
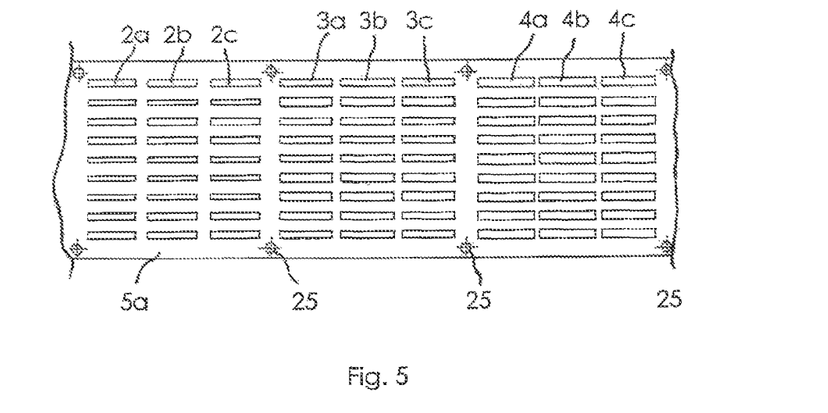
FIG. 5 shows a top view of a printed layer support.

FIGS. 4 and 5 also illustrate how, by means of the method according to the invention, several workpieces 1*a*, 1*b*, 1*c* can be built up simultaneously.

By means of printing drums 14*a*, 15*a*, 16*a*, 17*a*, 18*a*, several groups of layers 2*a*, 2*b*, 2*c*, 3*a*, 3*b*, 3*c*, 4*a*, 4*b*, 4*c*, seen from above in FIG. 5, are formed simultaneously, each group having the same form and structure. The layers 2*a*, 2*b*, 2*c*, 3*a*, 3*b*, 3*c*, 4*a*, 4*b*, 4*c* are then, as explained above, built up simultaneously by use of the die 6*a* on a carrier body 20*a* to obtain the workpieces 1*a*, 1*b*, 1*c*, which have the same form and structure.

It is obvious that, under appropriate open-loop and/or closed-loop control, workpieces can also be built up simultaneously which have forms and/or structures which are different from each other.

FIG. 5 also shows markings 25, which are applied to the layer support 5 during the printing step and are detected by a camera (not shown), so that, under the control of the open-loop and/or closed-loop control unit 24*b*, the layer support 5*a* can be moved as required to bring it into the transfer position.

In another exemplary embodiment, after the layers 2, 3, 4 or 2*a*, 2*b*, 2*c*, 3*a*, 3*b*, 3*c*, 4*a*, 4*b*, 4*c* have been arranged on the layer support 5, 5*a*, they are electrically charged, and the workpiece 1 is, or the workpieces 1*a*, 1*b*, 1*c* are, provided with a charge opposite that of the layers 2, 3, 4 or 2*a*, 2*b*, 2*c*, 3*a*, 3*b*, 3*c*, 4*a*, 4*b*, 4*c*, so that, when the layers 2, 3, 4 or 2*a*, 2*b*, 2*c*, 3*a*, 3*b*, 3*c*, 4*a*, 4*b*, 4*c* are moved down to the workpiece 1 or to the workpieces 1*a*, 1*b*, 1*c*, they are attracted by the workpiece 1 or the workpieces 1*a*, 1*b*, 1*c*, and arrange themselves on the workpiece 1 or the workpieces 1*a*, 1*b*, 1*c* as a result of the forces of electrical attraction.

Alternatively or supplementally, the die 6, 6*a* could be charged in such a way that the arrangement of the layers 2, 3, 4 or 2*a*, 2*b*, 2*c*, 3*a*, 3*b*, 3*c*, 4*a*, 4*b*, 4*c* on the workpiece 1 or the workpieces 1*a*, 1*b*, 1*c* is facilitated, by electrostatic repulsion.

Alternatively or supplementally, the layers 2, 3, 4 or 2*a*, 2*b*, 2*c*, 3*a*, 3*b*, 3*c*, 4*a*, 4*b*, 4*c* could be provided in magnetized or magnetizable form, and the carrier body 20, 20*a* and/or the workpiece 1 or the workpieces 1*a*, 1*b*, 1*c* could be magnetized in such a way that it or they attract the layers 2, 3, 4 or 2*a*, 2*b*, 2*c*, 3*a*, 3*b*, 3*c*, 4*a*, 4*b*, 4*c*. Alternatively or supplementally, the die 6 could be magnetized in such a way that it repels the layers 2, 3, 4 or 2*a*, 2*b*, 2*c*, 3*a*, 3*b*, 3*c*, 4*a*, 4*b*, 4*c* or is provided with an electromagnet, by means of which a magnetic field is created, which moves the layers 2, 3, 4, or 2*a*, 2*b*, 2*c*, 3*a*, 3*b*, 3*c*, 4*a*, 4*b*, 4*c* toward the carrier body 20, 20*a* or the workpiece 1 or workpieces 1*a*, 1*b*, 1*c*. The electromagnet can be used advantageously to produce the magnetic field at the specific point in time at which the individual layer 2, 3, 4 or 2*a*, 2*b*, 2*c*, 3*a*, 3*b*, 3*c*, 4*a*, 4*b*, 4*c* is located in the transfer position.

Figure 6:
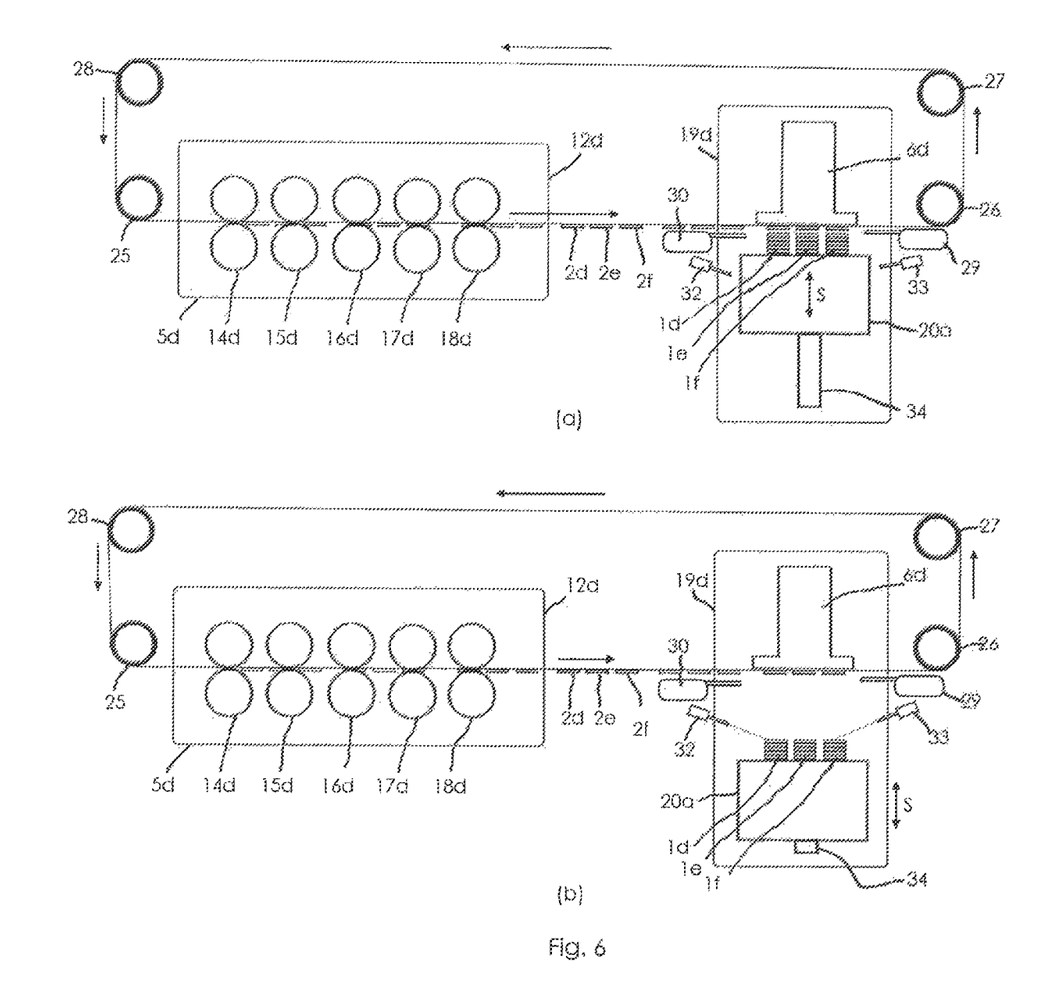
FIG. 6 shows another device according to the invention.

FIG. 6 shows another device according to the invention, which differs from those according to FIGS. 1 and 4 in that a layer support 5*d* is formed by an endless belt, which is moved via deflecting rollers 25, 26, 27, 28 through a printing unit 12*d* and a transfer unit 19*d*. After the layers 2*d*, 2*e*, 2*f* have been transferred to workpieces 1*d*, 1*e*, 1*f*, the locations on the layer support 5*d* where the layers 2*d*, 2*e*, 2*f* had previously been are guided in the direction of the arrows back to the printing unit 12*d*. The layer support 5*d* could, if necessary, be cleaned by means of a cleaning unit (not shown) as it proceeds on its way from the transfer unit 19*d* back to the printing unit 12*d*.

The device also differs from the devices according to FIGS. 1 and 4 in that the transfer unit is provided with spray devices 29, 30, by means of which the workpieces 1*d*, 1*e*, 1*f* with a solvent such as water or toluene to partially dissolve a carrier material such as binder resin, with which the layers 2*d*, 2*e*, 2*f* transferred to the workpieces 1*d*, 1*e*, 1*f* have been provided. After the new layers 2*d*, 2*e*, 2*f* have been transferred to the workpieces 1*d*, 1*e*, 1*f*, spraying the workpieces in the areas where the new layers 2d, 2e, 2f are arranged has the effect of partially dissolving the carrier material of the layers 2d, 2e, 2f and of the workpieces 1d, 1e, 1f, so that they bond to each other under the crosslinking of the individual carrier materials.

In addition, the transfer unit 19d comprises laser diodes 32, 33, by means of which the new layers 2d, 2e, 2f subordinated on the workpieces 1d, 1e, 1f can be heated to cure or sinter the layers 2d, 2e, 2f together with the workpieces 1d, 1e, 1f and thus to bond them. To bring the workpieces 1d 1e, 1f into a suitable position for spraying with the solvent and for heating with the laser diodes 32, 33, a carrier body 20a can be arranged on a height-adjustable base 34, so that its height can be adjusted.

The invention claimed is:

1. A production method, in which a workpiece is built up gradually in layers, comprising the steps of: forming a preformed layer on a layer support by a xerographic printing process, the forming step including forming the layer out of different materials and out of several sublayers stacked one on top of the other on the layer support, at least some of the sublayers being formed out of a carrier material and at least one of the group consisting of: ceramic, glass, metal oxide and metal; after the layer support has been printed by the xerographic printing process, completely rolling up the layer support, including the layer formed out of several sublayers, onto a roll; and transferring the preformed layer individually from the layer support to the workpiece and building up the workpiece from additional preformed layers.

2. The method according to claim 1, including transferring the layer to the workpiece in a pressing procedure, wherein the layer is applied to the workpiece or the workpiece is applied to the layer.

3. The method according to claim 2, including applying the layer to the workpiece by a die.

4. The method according to claim 1, wherein several workpieces are built up simultaneously, including simultaneously transferring several preformed layers to different workpieces.

5. The method according to claim 1, including forming the layer on the layer support by xerography.

6. The method according to claim 5, including forming the layer on the layer support using a laser printer.

7. The method according to claim 1, including arranging several layers side by side or one behind the other on the layer support, and, so that the individual layer can be transferred, arranging the layer support step by step in a transfer position in which the individual layer is transferred to the workpiece.

8. The method according to claim 1, wherein the layer support is a film or paper.

9. The method according to claim 8, wherein the layer support is silicone paper, waxed paper, or polytetrafluoroethylene-coated paper.

10. The method according to claim 7, wherein the step of arranging the layer support in the transfer position includes determining a position of the layer support and/or of the layer by a sensor, wherein the layer support is provided with at least one marking that allows its position to be determined.

11. The method according to claim 10, wherein the sensor is a camera.

12. The method according to claim 1, including removing the layer from the layer support by at least one of the group consisting of heating, electrical attraction or repulsion, magnetic attraction or repulsion, or ultrasound.

13. The method according to claim 12, including removing the layer from the layer support by heating with infrared radiation or a laser.

14. The method according to claim 1, including forming the layer out of different materials.

15. The method according to claim 1, including arranging the sublayers successively on the layer support.

16. The method according to claim 1, including applying to the layer, after the layer has been transferred to the workpiece, an agent for dissolving a carrier material of the layer so that the agent partially dissolves the carrier material of the layer and a carrier material of the workpiece in an area of the workpiece on which the layer rests, so that under crosslinking of the carrier materials the layer and the workpiece bond to each other.

17. The method according to claim 16, wherein the agent is sprayed on the layer.

18. The method according to claim 1, further including heat-treating the workpiece.

19. The method according to claim 18, wherein the workpiece is sintered.

20. The method according to claim 18, including heating the workpiece as a whole, or heating each individual layer or several layers jointly after arrangement on the workpiece.

21. The method according to claim 20, including heating with a laser.

22. A device for a successive, layer-by-layer buildup of a workpiece, comprising: a layer support; a xerographic printing unit for forming a layer on the layer support; and a transfer unit for transferring the layer from the layer support to the workpiece, wherein the xerographic printing unit is configured to form the layer out of different materials and out of several sublayers stacked one on top of the other on the layer support, at least some of the sublayers being formed out of a carrier material and at least one of the group consisting of: ceramic, glass, metal oxide and metal, wherein the xerographic printing unit is configured to completely roll up the layer support, including the layer formed out of several sublayers, onto a roll after the layer support has been printed with the layer, the roll being set up for use in the transfer unit, wherein the transfer unit and the printed roll are set up to build up the workpiece from a plurality of layers having sublayers.

23. The device according to claim 22, wherein the transfer unit is configured to bond the layer to the workpiece and to remove the layer from the layer support, wherein the layer support is movable to the workpiece or the workpiece is movable to the layer support.

24. A layer support with a roll, wherein several layers are arranged on the layer support that have been applied to the layer support by a xerographic printing process and which are provided for a layer-by-layer buildup of a workpiece, wherein each of the layers is formed of several sublayers stacked one on top of the other on the layer support and are formed of different materials, wherein the layer support including the layers is rolled up completely onto the roll, which is set up for use in a unit for transferring the layers from the layer support to the workpiece.

* * * * *